United States Patent

[11] 3,587,448

| [72] | Inventors | Charles Wayne Hemphill;<br>Werner Peter Goldkuhle, Lubbock, Tex. |
|---|---|---|
| [21] | Appl. No. | 747,900 |
| [22] | Filed | July 26, 1968 |
| [45] | Patented | June 28, 1971 |
| [73] | Assignee | Concentric Engineering Company<br>Dallas, Tex. |

[54] METHOD OF BALING MATERIAL
4 Claims, 20 Drawing Figs.

[52] U.S. Cl.................................................. 100/3,
100/11, 100/17, 100/30, 100/33, 140/93.2
[51] Int. Cl............................................B65b 13/02,
B65b 13/30
[50] Field of Search............................................ 100/3, 191
(Cursory), 175, 173, 19, 29, 30, 33, 192, 11;
29/509, 515; 24/20, 265.1; 140/93.2

[56] References Cited
UNITED STATES PATENTS

| 1,516,682 | 11/1924 | Peabody.......................... | 24/20 |
| 1,746,201 | 2/1930 | Tashjian......................... | (29/515UX) |
| 1,889,372 | 11/1932 | Nolan.............................. | 100/19X |
| 2,595,503 | 5/1952 | Altgelt............................ | 100/3X |
| 3,086,456 | 4/1963 | Englund......................... | 100/192 |
| 3,139,813 | 7/1964 | Hall et al........................ | 100/30X |

FOREIGN PATENTS

| 650,785 | 10/1962 | Canada........................ | 100/19 |
| 1,016,781 | 1/1966 | Great Britain................ | 100/17 |

*Primary Examiner*—Billy J. Wilhite
*Attorney*—Marcus L. Bates

ABSTRACT: A method of baling material wherein the material is partially compressed as it is forced into a tunnel. A reciprocating piston slidably received within the tunnel completes the compression of the material into a bale. A band which extends about the bale is fastened while the bale is held compressed by the piston. A movable wall member presses against each completed bale to enable one end thereof to act as a bulkhead against which the material is compressed by the piston as a new bale is formed within the tunnel. A passageway formed in the piston face enables a band fastening device to pass between the piston face and a previously formed bale in order to fasten the band while the bale is maintained compressed by the piston.

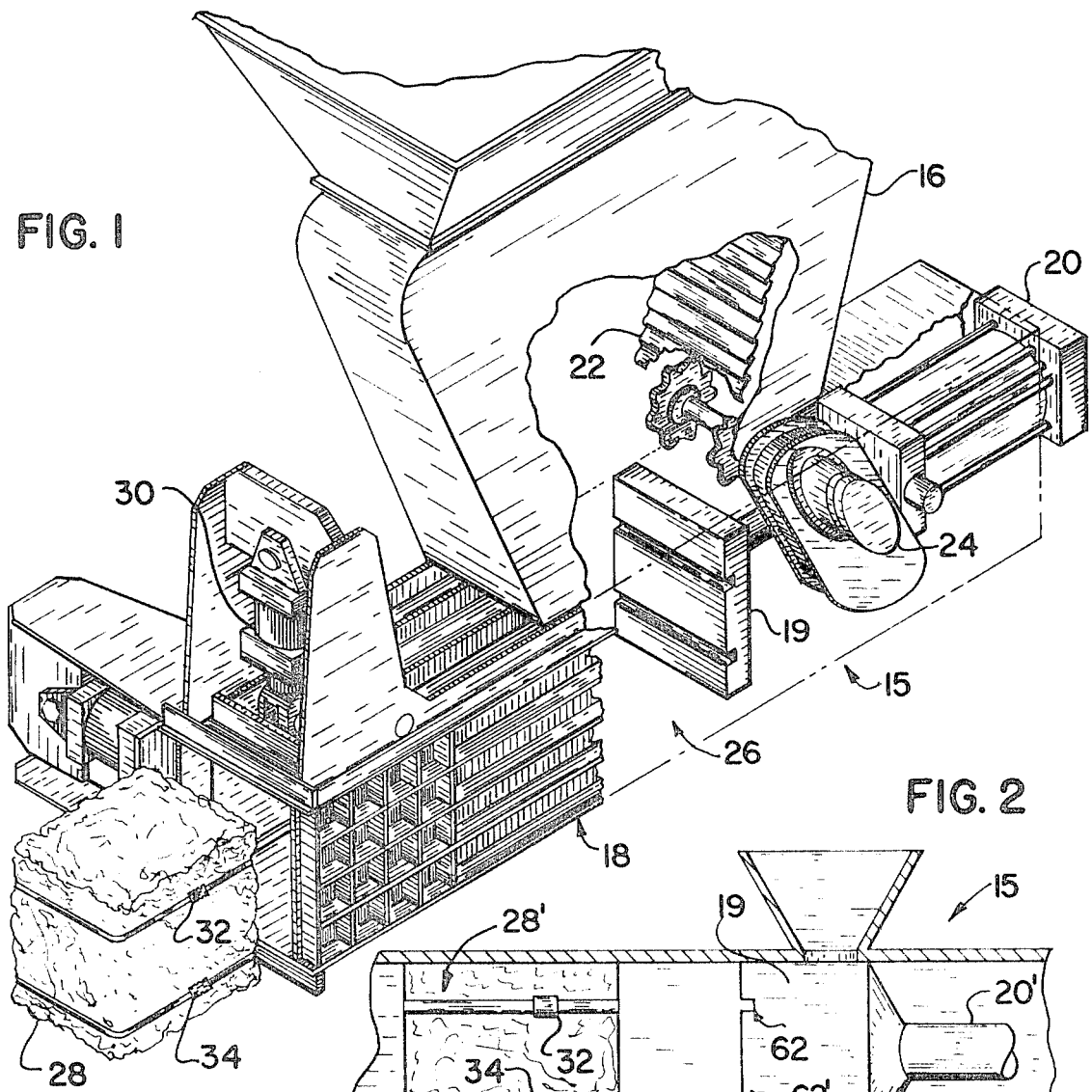
FIG. 1
FIG. 2
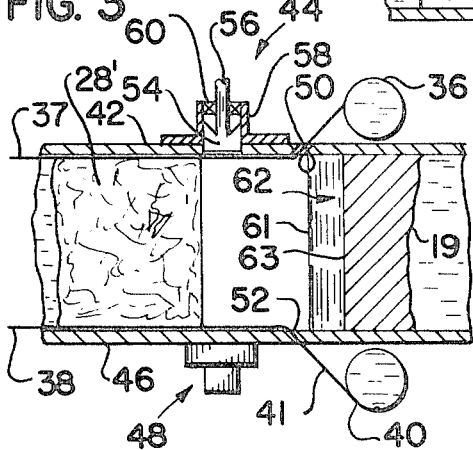
FIG. 3
FIG. 4

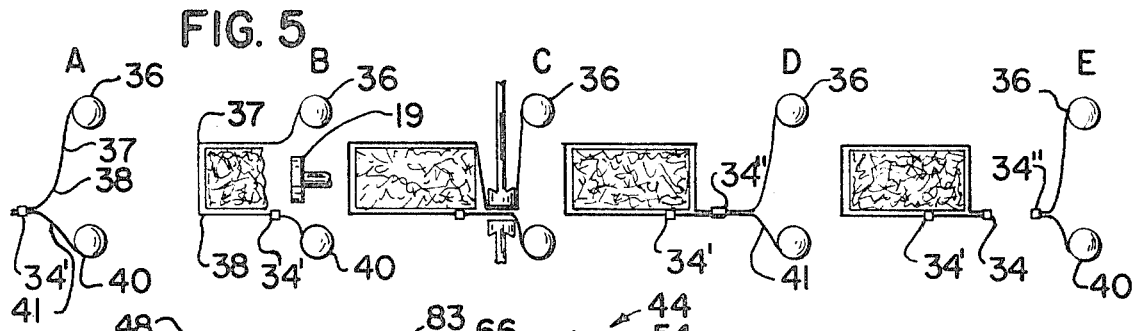
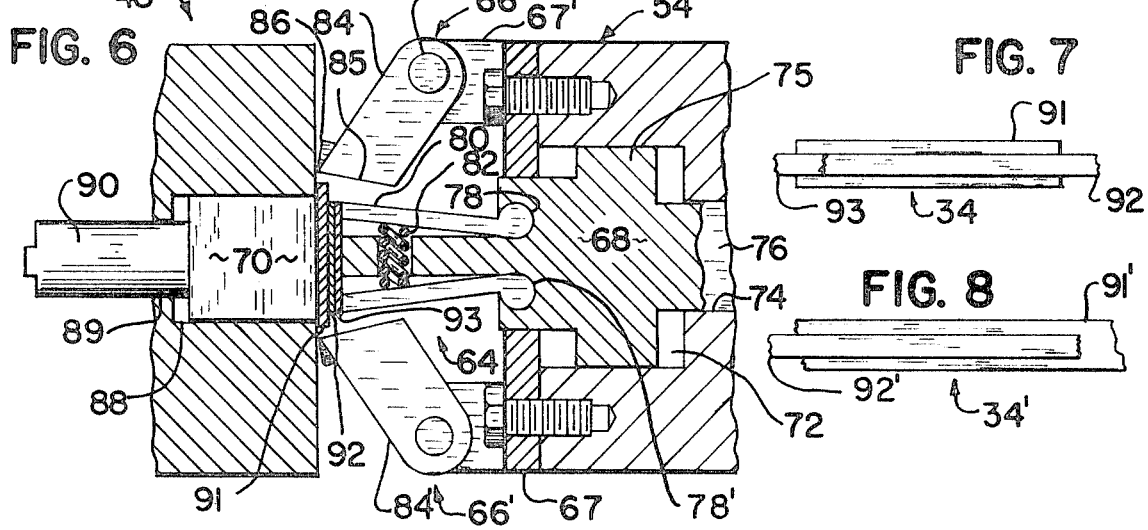
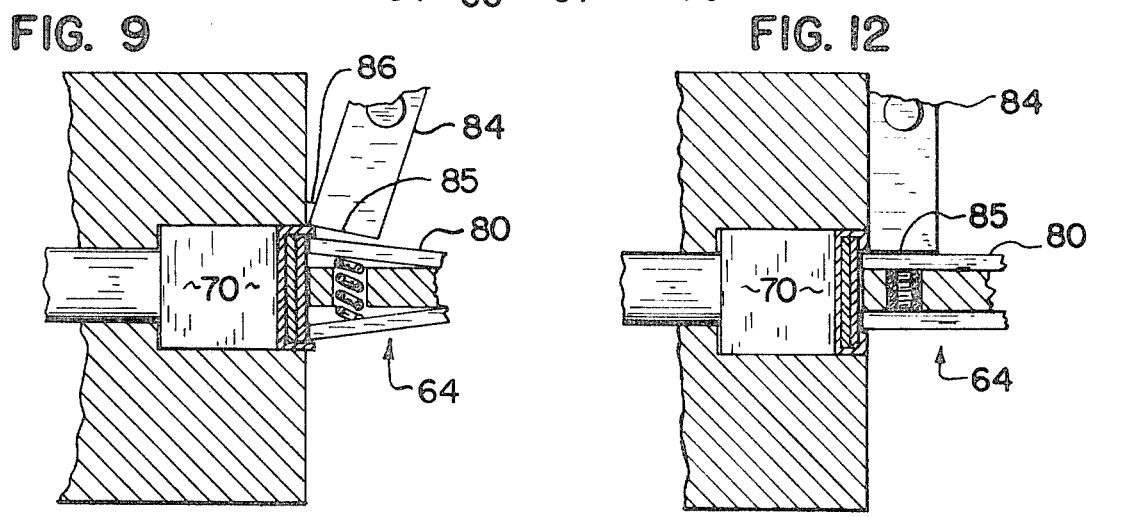
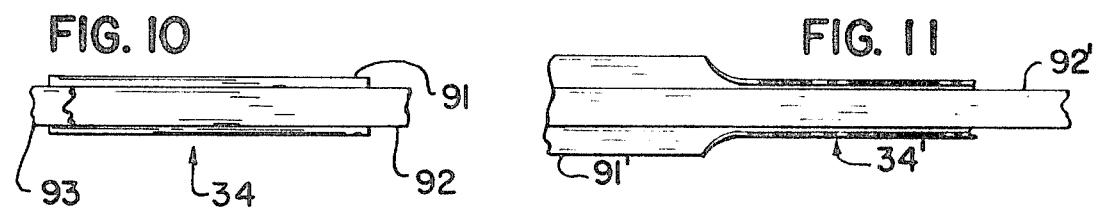

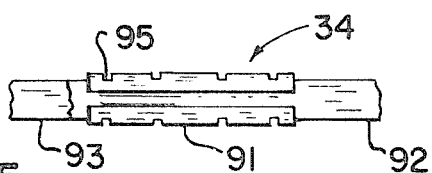
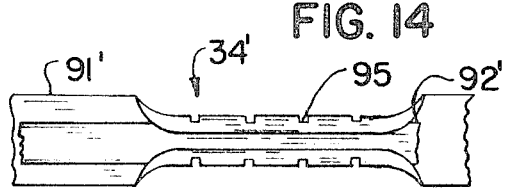
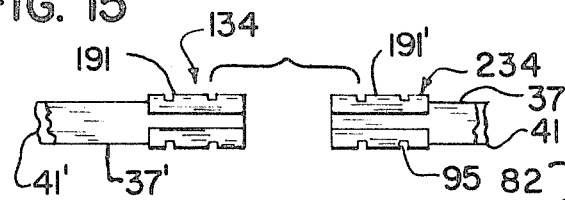
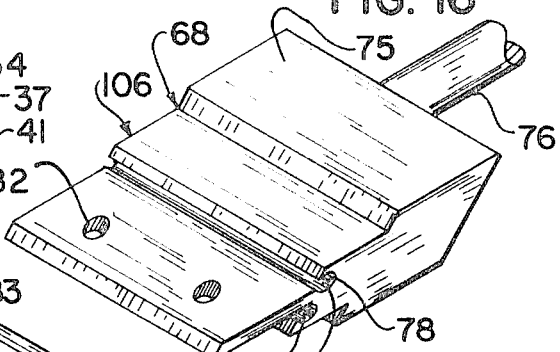
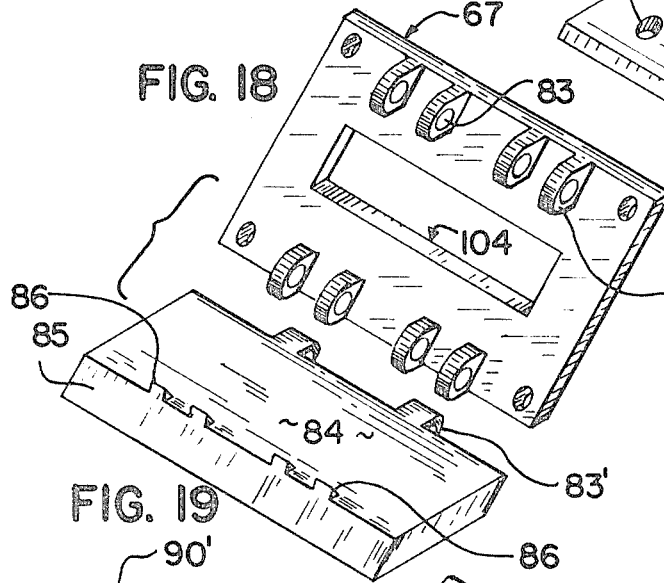
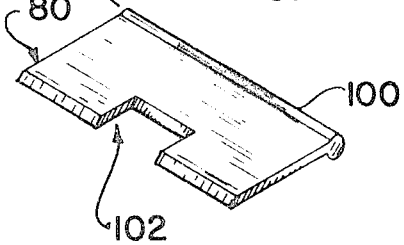
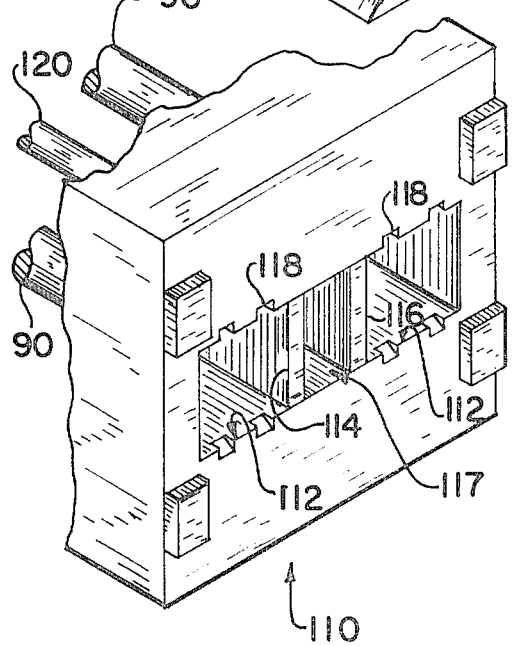
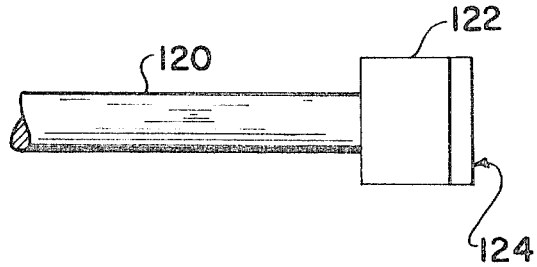

METHOD OF BALING MATERIAL

REFERENCE TO RELATED APPLICATIONS

Ser. No. 572,520; filed Aug. 15, 1966; entitled "Method And Apparatus For Disposing of Refuse."

BACKGROUND OF THE INVENTION

The disposal of refuse by baling loose or compressible material is a complex operation and usually requires a baling apparatus having a tunnel within which a movable piston is reciprocatingly received with each stroke of the piston compacting increments of refuse until a bale of predetermined size is formed. After the bale has been formed, a trapdoor is opened, the bale removed from the tunnel, whereupon the bale may then be fastened or tied with banding material or the like. This operation causes the bale to become decompressed due to the removal of pressure which was previously exerted upon the bale by the piston. The past art has heretofore provided various means by which the bales may be tied while in a compressed condition as evidenced by tied or banded bales of cotton. Still others have adapted the baling operation to a semicontinuous process by providing plate members which are inserted between adjacent bales in order to enable the banding operation to be carried out. The plate members are generally removed along with the bale through a trapdoor at the end of the tunnel. The various steps involved in the prior art baling apparatus are generally time consuming and requires several workmen to properly operate the apparatus.

SUMMARY OF THE INVENTION

The present invention contemplates a method of compacting any compressible material into a bale so as to realize a considerable reduction in its size. The method includes supercharging the material into a tunnel so as to effect a first stage compaction, whereupon a reciprocating piston subsequently compresses increments of the material into a bale. A movable wall member maintains the completed bales under a predetermined pressure and therefore controls the density of the baled material, while at the same time providing an oppositely disposed end wall or bulkhead against which the piston compresses each increment of material as the bale is being formed. Upon completion of a bale, the bale is tied or banded while held compressed between the end wall of an already completed bale and the face of the piston.

In carrying out the bale tying or banding operation, apparatus is provided which cooperates with a passageway provided in the face of the piston so as to permit a fastening device to pass through the passageway, carrying therewith a band which has been previously placed about three sides of the bale. The band is placed about the fourth side of the bale, and fastened in a manner to hold the bale together. At the same time the band is cut in a manner to leave the end portions which enclose the bale fastened together and at the same time leaves the remaining ends fastened together and across the face of the piston. The piston is now free to continue compressing increments of material into another bale while the banded bale acts as a bulkhead as it moves through the tunnel. Upon completion of another bale, the banding material is again located about three faces of the bale and may be fastened about the fourth side thereof by the operation of the fastening device.

It is therefore a primary object of the present invention to provide method for compacting material into bales.

Another object of the invention is to provide method for banding bales while the bales are held compressed.

Another object of the present invention is the provision of a method of greatly reducing refuse in volume.

Another object of the present invention is the provision of a method of baling which utilizes previously formed bales as a bulkhead against which additional bales are formed.

A further object of the present invention is the provision of an improved mechanism for fastening bands about compressed bales of material.

A still further object of this invention is the provision of a first stage compaction means which greatly increases the through-put of refuse in a baling apparatus.

Still another object of this invention is the provision of an improved fastener for use in fastening bands about bales of compressed material.

Other objects of the invention will become apparent in the remaining portion of the present disclosure.

BRIEF DESCRIPTION OF THE DRAWINGS

FIG. 1 is a perspective view of a baling apparatus which has been fabricated in accordance with the various embodiments of the present invention;

FIG. 2 is a fragmentary diagrammatical cross-sectional representation of a side view of FIG. 1;

FIG. 3 is a fragmentary cross-sectional diagrammatical view taken along line 3–3 of FIG. 2;

FIG. 4 is similar to FIG. 3, but with the apparatus shown in a different operative position;

FIGS. 5A through 5E schematically sets forth the various operations required in order to place bands about each of the bales which have been made by the apparatus disclosed in the foregoing FIGS.;

FIG. 6 is an enlarged fragmentary cross-sectional representation of part of the device seen in the foregoing FIGS.;

FIGS. 7 and 8 schematically set forth alternate configurations of the bands associated with FIG. 6;

FIG. 9 is a fragmentary representation of the device of FIG. 6, but with the apparatus shown in a different operative position;

FIGS. 10 and 11 show the configuration of the fastener means as it undergoes deformation by the illustrated apparatus of FIG. 9;

FIG. 12 illustrates the relative position of some of the parts of FIG. 6 upon completion of the fastener means;

FIGS. 13 through 15 illustrate the appearance of the fastener means associated with FIG. 12;

FIG. 16 is an enlarged perspective view of part of the apparatus seen in FIG. 6;

FIG. 17 is also an enlarged perspective view of part of the device seen in FIG. 6;

FIG. 18 is another enlarged perspective view of two different parts of the device seen in FIG. 6;

FIG. 19 is still another enlarged perspective view of part of the device seen in FIG. 6; and FIG. 20 is a side view of part of the device seen in FIG. 19.

DETAILED DESCRIPTION OF THE DRAWINGS

FIG. 1 sets forth an apparatus for compacting material, and especially refuse, which has been constructed in accordance with the teachings of the present invention. As seen in FIG. 1, refuse which may be deposited within hopper 16 will be transferred into a compacter tunnel 18 where it is compressed by piston 19. Power cylinder 20 reciprocatingly moves the piston within the tunnel and each cycle or stroke of the piston compresses an increment of refuse so as to ultimately form a completed bale. A primary refuse compactor having spaced apart upwardly diverging conveyor means, one of which is indicated by numeral 22, is powered by the illustrated hydraulic motor 24. Area 26 generally indicates the position where a completed bale of refuse remains within the tunnel. Another completed bale 28 has been forced through the tunnel at a rate which is determined by the pressure exerted thereon by the illustrated movable wall member. The movable wall member is connected to means for applying pressure in the form of a hydraulic cylinder 30. As further seen in FIG. 1, each bale is provided with two spaced apart metallic bands, the ends of which are fastened together as seen indicated by the numerals 32 and 34.

Looking now to the details of FIG. 2 in conjunction with the remaining FIGS., the piston 19 is seen to be affixed to power shaft 20' and has completed forming bale 28'. The bale has been provided with spaced apart bands which are fastened at 32 and 34.

Looking more particularly now to FIGS. 3 through 5, the bale 28' is seen to be spaced apart from the piston 19 in order to permit another increment of refuse to be charged into the tunnel ahead of the piston. A band supply reel 36 provides a continuous supply of banding material with the banding material extending as seen at 37 around the completed portion of the bale where the banding material returns at 38 along a wall of the tunnel to where it continues at 41 into the band supply reel 40. Tunnel wall 42 includes band fastening means 44 rigidly attached thereto. Tunnel wall 46 is diametrically opposed and preferably parallel to the wall 42 and includes band cutting head 48 rigidly attached thereto. Slots 50 and 52, respectively, receive banding material from reels 36 and 40, respectively, therethrough. The banding material passes under a band injector 54 with the injector being actuated by shaft 56. Housing 58 encloses the injector and includes seal means 60 for reciprocatingly receiving the before-mentioned shaft.

Face 61 of the piston includes two spaced apart passageways 62, 62' with the passageways having an inside wall portion 63. As seen in FIG. 4, the piston can be forcibly held against the compressed bale while the band injector travels through a passageway into intimate contact with the band cutting head.

FIG. 5A shows band supply reel 36 having band 37 extending at 38 to fastener 34' which connects the band from reel 36 to the band from reel 40. FIG. 5B shows a partially completed bale with the band extending about three sides thereof and with the piston being in the act of building up the bale. FIG. 5C shows a completed bale being provided with banding material on the fourth side thereof, wherein the band injector head has been extended into close proximity to the band cutting head, carrying the band along with it. FIG. 5C broadly corresponds to the position of the device seen in FIG. 4. Looking to FIG. 5D it will be noted that the band now surrounds the completed bale with the material from each reel being attached to fastener 34''. FIG. 5E shows the completed banded bale wherein fastener means 34'' has been transversely cut by the cooperative action between the band injector and band cutting head so as to leave the free depending ends of the bands from reels 36 and 40 connected or fastened together, in the same manner as seen in FIG. 5A.

FIG. 6 is an enlarged detail which shows the band injector and band cutting head in the same operative position as seen in FIGS. 4 and 5C. The injector slidably supports an expansible press 64 and further includes spaced apart sealer deforming members 66, 66'. Plate member 67 is bolted to the housing and includes mounting ears 67' outwardly depending therefrom. A mandrel having enlarged piston 68 formed thereon is slidably received for limited reciprocatory motion within the housing. The outermost portion of the mandrel comes into close proximity to a plunger 70 which is reciprocatingly received within the band cutting head. Cylinder 72 reduces in diameter at 74 so as to slidably receive enlargement 75 and shaft 76 of the mandrel therein.

Longitudinally extending spaced apart cavities 78, 78' pivotally receive outer wall members 80 therein with the wall members being biased apart by means of the illustrated springs 82 located within the illustrated apertures of the outermost mandrel portion. Spaced apart elongated dogs 84, 84' include edge portion 85 which normally are brought to bear against the outermost wall surface of the outer wall member 80, with the dogs being pivotally mounted at 83 to the before mentioned mounting ears. A multiplicity of spaced apart crimping means 86 are provided on an outermost edge portion of the dog for deforming the sealer in a manner which provides spaced apart crimps or incisions in the completed fastener. Cavity 88 reduces in diameter at 89 so as to reciprocatingly receive the before-mentioned plunger 70, The plunger is integrally attached to shaft 90.

Sealing material 91 is wider than banding material 92 and 93. As seen in FIG. 7, the fastener may be comprised of sealer 91 together with bands 92 and 93 or alternatively, the sealer may be dispensed with and one wide length of banding material 91' used in conjunction with a narrow or regular length of banding material 92', with the wider banding material forming the dual function of both the sealer and a band.

Looking now to the details of FIG. 9 in conjunction with FIGS. 6, 10, and 11, the band forming head 44 is seen to be approaching the band cutting head 48 so as to cause dogs 84 to bend the marginal edge portions of sealer 91 about the bands in a manner to form a U-shaped channel within which the bands are enclosed. The outer wall members 80 are noted to have been partially received within cavity 88 while plunger 70 has traveled in a rearward direction. FIG. 10 illustrates the configuration of the fastener when sealer material 91 is used in conjunction with banding material 92, 93, while FIG. 11 shows the configuration of the fastener when wide banding material 91' is used in conjunction with band 92'. Band 91 has been upset at 34' into a U-shaped channel which encloses the narrow banding material 92'.

FIG. 12 shows the configuration of the band injector during the final step of forming the fastener, wherein the dogs have rotated to where a forwardmost face thereof abuts the outermost face of the band cutting head, and the outer wall members have been forced against the sidewalls of the outermost portion of the mandrel. FIG. 13 illustrates the completed sealer which corresponds to FIG. 12. The sealer encloses each remaining band with a multiplicity of crimps or incisions 95 being formed at spaced apart positions along the marginal edge portions thereof. FIG. 14 shows the configuration of the wide and narrow band material which enables the sealer to be eliminated. Fig. 15 shows the fastener means after it has been cut apart transversely by an automatically actuated knife, as will be explained in greater detail later on.

Looking now to the details of FIGS. 16, there is seen illustrated therein the before-mentioned mandrel which has the outermost portion thereof provided with spaced apart apertures through each of which the before-mentioned springs 82 is received. The concave elongated aperture 78 is seen to extend longitudinally across the entire mandrel. As seen in FIG. 17, the outer wall member 80 includes an enlarged cylindrical edge portion 100 which is slidably received within the concavity 78 so as to pivotally mount the member therein. Cutout 102 reciprocatingly receives a knife edge therethrough, as will be explained in more detail later on.

As seen in FIG. 18, spaced apart mounting ears 67' are provided in pairs with one of the dogs adapted to be journaled at 83'. Aperture 104 receives the outermost portion of the mandrel therethrough with the face 106 of the enlarged portion of the mandrel being received in close fitting relationship within aperture 104, as best seen in FIG. 6 in conjunction with FIGS. 16 and 18.

Looking now to the details of FIG. 19 which sets forth the construction of the outermost face of the band cutting head, there is seen spaced apart shafts 90, 90', each of which is connected to a plunger such as illustrated in FIG. 6. One plunger is received within cavity 112 with the remaining plunger being spaced apart from and located in the second cavity 112, with either cavity 112 broadly corresponding to cavity 88 of FIG. 6. Spaced apart walls 114, 116 form rectangular chamber 117 within which a knife 122 having cutting edge 124 thereon is actuated by shaft 120. Spaced apart cutouts 118 receive the before-mentioned crimp forming portion 86 therein so as to crimp the fastener in a manner as illustrated at 95 in the foregoing FIGS.

As will now be evident to those skilled in the art, the band cutting head is comprised of two spaced apart plungers which are separated from one another by the knife 122, while each plunger is aligned with the single mandrel. The mandrel preferably forms a fastener 34 which lends itself to becoming two fasteners 134, 234 when transversely cut apart as in FIG. 15.

OPERATION

In the operation of the baling apparatus disclosed in FIG. 1, refuse or other compressible material which lends itself to being compressed into a bale is deposited within hopper 16, whereupon the downwardly converging spaced apart conveyor means, one of which is seen at 22, forces the refuse in a downward direction while at the same time substantially compacting the refuse. As piston 19 reciprocates within the tunnel 26, increments refuse are forced into the tunnel so as to form a bale at 18. Previously formed bales travel through the remainder of the tunnel at a rate which is controlled by the illustrated hydraulic piston 30 while exerts a pressure against the illustrated movable wall member. This action enables the end of each completed bale to provide a movable bulkhead against which additional refuse is compacted. As each bale is completed, the piston is maintained compressed against the bale while the band is fastened thereabout, with two spaced apart bands preferably being arranged about the bale in the illustrated manner of FIG. 1.

As best seen in FIG. 5, in conjunction with the remaining FIGS., each band is provided by the cooperation of the two spaced apart band containing reels 36 and 40 which provide banding material with the free ends of the bands from each reel being attached together as seen at 34'. Fastener 34' has been previously affixed to each of the bands, as will be better understood later on. As the piston reciprocatingly compresses additional increments of refuse into the bale, the band is carried along between the interface of the last completed bale and the bale which is being formed as seen at 5B. After a sufficient accumulation of compressed refuse is pressed into a bale, a band injector travels along a passageway formed within the face of the piston to thereby bring the band material from reel 36 into close proximity of the band material from reel 40. This action forms an elongated fastener such as illustrated in FIGS. 13 or 14. After the bend has been sealed or fastened together, a knife located within cavity 117 transversely cuts the fastener into two pieces as illustrated in FIG. 15. This provides two fasteners, one of which is seen in FIG. 5E at numeral 34, the other is seen at numeral 34''. Still looking at FIG. 5E, the fastener 34'' now connects the band from reels 36 and 40 in the same manner of FIG. 5A, and the next bale can be built in the above-described manner.

Where it is desired to fasten each band from reel 36 and 40 together with sealing material, a third reel (not shown) must be provided so as to provide sealer 91. Such an expedient is considered within the comprehension of those skilled in the art. It is preferred however, to utilize wide banding material 91' upon reel 40 so as to permit the wider band to form the sealer or fastener as well as to provide a portion of the entire band which encompasses the bale. In order to conserve the wider material, a limited length is used as evidenced by noting the distance between fasteners 34 and 34' in FIGS. 5D and 5E. The tension of the band about the compressed bale can be regulated by governing the pressure exerted by piston 19 during the band forming operation, or alternatively, by controlling the relative position of the band cutting head with respect to the band injector or band forming head as the fastener is being formed.

Looking now specifically to the operation of the means for forming the fastener, it will be realized that the band injector is disposed in one wall 42 of the tunnel with the band cutting head being disposed in an opposite wall 42 of the tunnel, and with each head being aligned with the other and along each of the central axis of the passageways which are formed in the face of the piston. As the bale is formed, the piston is held stationary and positioned in alignment with the band injector and the band cutting heads whereupon shaft 56 forces the band injector through a passageway of the piston and into contact with the band cutting head. Since the banding material 37, 38 is already placed about three sides of the bale, with each of the bands, respectively, being centrally located across the face of each head, respectively, this action carries banding material from reel 36 into superimposed relationship with the band forming material from reel 40, as seen in FIG. 4 in conjunction with FIG. 5C. As the band injector or band forming head nears the band cutting head, the relative position of the two heads is substantially as illustrated in FIG. 6. As the head 44 moves into closer contact with the face of head 48, longitudinal edge portion 85 of the dogs deform the larger band 91' into a U-shaped channel as seen in FIGS. 9 and 10. This action encloses the single band 92' within the channel formed by the band 91', and further movement of the band injector completes the fastener operation as seen in FIG. 12. During this later stage of operation, the crimping members 86 force a limited edge portion of the fastener into the grooves 118 so as to crimp the fastener to thereby form a "fix" or locking point as substantially seen at 95 in FIG. 13. With the two heads in the relative position of FIG. 12, knife edge portion 124 is moved by shaft 120 against the completed fastener to cut the fastener into two portions thereby forming two individual fasteners as illustrated in FIG. 15. This action is also illustrated in FIGS. 5D and 5E and results in two fasteners being provided; with one fastener tying the bale and the other fastener tying the depending ends of the bands which emerge from reels 36 and 40.

Looking again to FIG. 6 it will be seen that mandrel 68 has an enlarged head 75 received within a cavity which limits the reciprocatory motion of the mandrel. The band cutting head likewise has a plunger received within a cavity so as to limit the travel thereof. Upon the band forming head initially approaching the band cutting head, dogs 84 come into contact with the outer wall member so as to compress the outer wall members against the illustrated spring as the end portion of the larger band 91 is upset from a U-shaped channel of FIGS. 9 through 11 into the configuration of FIGS. 12 through 15.

After the fastener has been cut in the manner of FIG. 15, the band forming head is retracted back into the configuration of FIG. 3 whereupon the operation illustrated in FIG. 5 can again commence.

Accordingly the present invention provides a means by which bands can be automatically placed about a bale while the bale is maintained under a predetermined hydraulic pressure. These bands are provided with a fastener or sealer after which the fastener is notched and sheared. By utilizing preloaded completed bales, the use of trap doors, spacers, or blocks between each bale, as well as separate banding operations are eliminated and accordingly the baling operation can be completely automated.

Having now explained our invention, the metes and bounds of the intellectual property which we deem to be inventive is defined in accordance with the following claims.

We claim:

1. A method of baling material of the type in which a piston is reciprocated in a tunnel and has a material contacting and compressing face, wherein the improvement comprises:

feeding lengths of elongated, relatively wide, relatively thin band material from a pair of sources located on opposite sides of the tunnel to a crimp-type fastener and thereby forming a continuous band that extends across the interface between the piston and a previously formed bale;

forming a new bale between the previously formed bale and the piston so that the continuous band encloses three sides of the new bale as it is formed;

moving a portion of one of the lengths of band material across the face of the piston so that the continuous band encloses the new bale on four sides;

forming a crimp-type fastener that interconnects the length of band material from one source and the length of band material from the other source, and cutting the crimp-type fastener into two such fasteners and thereby simultaneously maintaining a continuous band around the new bale and interconnecting the two lengths of band material.

2. The method according to claim 1 wherein the length of band material that is fed from one of the sources is wider than the length of band material that is fed from the other source and wherein fastener forming step is carried out by crimping the wide band material around the narrow band material to form a crimp-type fastener.

3. The method according to claim 2 wherein the tension on the band material from the one source is greater than the tension on the band material from the other source during the feeding, bale forming and moving steps so that the continuous band around the new bale comprises a relatively long length of narrow band material and a relatively short length of wide band material.

4. The method according to claim 1 wherein the crimp-type fastener is formed by crimping a length of sealing material around the two lengths of band material.